March 17, 1931.  E. W. DAVIS  1,796,833
COUPLING
Original Filed March 18, 1926

Inventor:
Ernest W. Davis
By: Williams, Bradbury,
McCaleb & Hinkle
Attys.

Patented Mar. 17, 1931

1,796,833

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

COUPLING

Original application filed March 18, 1926, Serial No. 95,688. Divided and this application filed May 12, 1927. Serial No. 190,694.

My invention relates to lubrication, and more specifically to an improved coupling for connecting the discharge tube, or opening, of a source of lubricant under pressure to means fixed on the bearing, or machine element, to be lubricated for receiving such lubricant under pressure.

This application is a division of my co-pending application, Serial No. 95,688, filed March 18, 1926, for couplings.

An object of the invention is to provide a new and improved coupling.

Another object is to provide a simple form of coupling which is economical to manufacture and which can be easily standardized for large production.

Another object is to provide a coupling in which the parts are easily accessible and may be readily replaced.

Another object is to provide a coupling which is durable and certain in operation.

Other objects and advantages will appear as the description proceeds.

The problem involved is unique on account of the small volumes to be handled, the relatively wide range and high upper limit of the pressures to be carried and the unusually objectionable features from a service standpoint of even a very slight leakage. Thus, a relatively small quantity of lubricant is all that need be injected at each lubrication into an ordinary bearing, and a moderate pressure is often sufficient, but the equipment employed is usually capable of generating relatively high pressures of the order of magnitude of one thousand pounds per square inch or more, for forcing the lubricant positively into places clogged with dirt or old lubricant, and such high pressures are required at frequent intervals in service. Furthermore, a very slight leakage soon soils the parts and destroy one of the main advantages rendering lubricating systems of the type involved superior to ordinary grease cups, viz. cleanliness.

Figure 1:
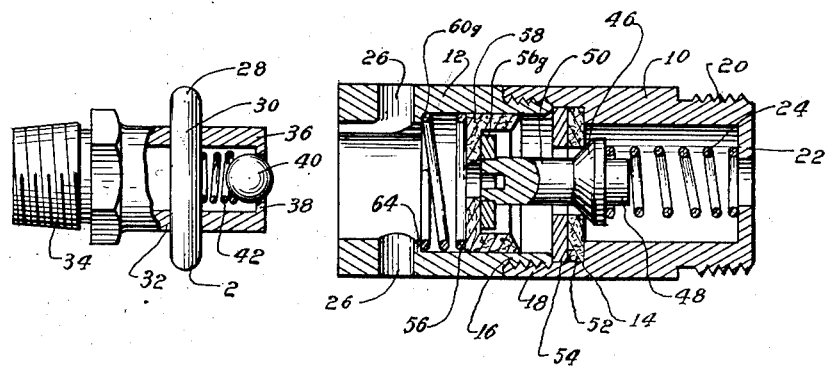
Figure 2:
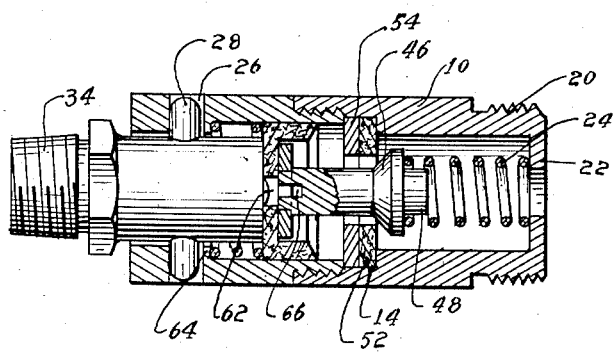

In the accompanying drawings:

Figure 1 is a central section of the two elements of my improved coupling showing them in separated relation; and Figure 2 is a similar section showing the two elements in coupled relation.

In the embodiment shown, the female coupling member comprises two sleeves, a rear, or inlet, sleeve 10 and a front, or discharge, sleeve 12. The two sleeves are of smooth, uniform configuration and identical diameter so that they appear in use as a single element. On the inside, one of the sleeves is enlarged as at 14 to form a shoulder, and the threaded end 16 on the other sleeve engages the threads 18 in the first sleeve to fasten the parts together. The channel thus formed between the end portion 16 and the opposing shoulder receives and clamps in place a suitable seat for the valve.

The rear sleeve is threaded as at 20 for attachment to the discharge opening of a grease gun, or the end of a suitable conduit for conveying lubricant under pressure into the coupling. Its rear end is also provided with an inwardly extending flange 22 forming a seat for the valve spring 24.

The front sleeve is provided with a pair of bayonet slots 26 for receiving the projecting ends 28 of a pin 30 passing transversely through the tubular body 32 of a male coupling member, commonly referred to by the trade as a "fitting". The fitting has a threaded tubular end portion 34 for attaching the same to a bearing, or the like, a smooth contact face 36 at its receiving end for forming a lubricant seal, and a shoulder at 38 forming a valve seat. The ball check valve 40 is held against the seat 38 by a suitable spring 42.

The slots 26 are preferably provided with a return pocket or reversely inclined inner end portion such as shown in my Patent No. 1,401,765, of December 27, 1921.

In the embodiment of the invention selected for illustration, the valve comprises a valve member proper 46, carrying a stud 48 for centering the spring 24, and having a rigid stem 50. The valve proper 46 seats on an annular ring 52 of leather, fibre, or other material suitable for forming a tight seal, reinforced by a metal ring 54, both clamped in place by assembling the front and rear sleeves. The valve stem terminates in a reduced end portion 56 on which is carried a washer 56g. This washer serves as a back support for the cup-shaped sealing member 58 of leather, or other suitable material. This cup leather is held in contact with the washer 56g by means of a light spring 60g confined between the cup leather and a shoulder 64 formed in the sleeve 12.

When the end of the fitting is inserted in the end of the female coupling member, as shown in Figure 1, the slots 26 engage the ends 28 of the pin 30 and draw the end 36 of the fitting inwardly until it contacts with the cup leather 58. The continued inward movement of the fitting compresses the spring 24 and raises the valve 46 from its seat, thus placing the fitting in communication with the source of lubricant supply, the cup leather 58 being provided with a central opening 62 which coincides with a slot 66 in the valve stem 50 to provide a passage connecting the inlet opening in the fitting with the bore in the sleeve 12. The tension of the spring 24 is such as to establish an initial seal between the cup leather and the end of the fitting before the valve 46 is raised from its seat and after the valve 46 has been opened, this initial seal being reinforced by the pressure of the lubricant acting on the inside of the cup leather 58 to force this cup leather against the end of the fitting and the walls of the discharge sleeve 12. The reversely inclined parts 44 of the slots 26 serve merely to lock the fitting and the female coupling element in coupled relation, and prevent accidental disengagement thereof.

When the fitting is removed from the position shown in Figure 2 to that shown in Figure 1, the valve 46 will move down on its seat due to the action of the comparatively strong spring 24 and simultaneously the lighter spring 60g will be further compressed between the cup leather 58 and the shoulder 64. As soon as the valve 46 has been firmly seated on the annular seat 52, the forward movement of the valve, valve stem, and sealing washer ceases. The spring 60g merely serves to hold the cup leather 58 firmly against the washer 56g at all times and may, therefore, be made comparatively weak and must, of course, be much weaker than the spring 24. The use of the spring 60g to maintain the cup leather 58 in contact with the washer 56g instead of depending upon the shoulder 64 to perform this function, as for instance, by locating the shoulder 64 in close proximity to the outer face of the cup leather when positioned as shown in Figure 2, results in the cup leather 58 being always held firmly against the washer 56g and also provides a construction which adjusts itself to slight inaccuracies in manufacture, whereas, if the shoulder 64 were solely relied upon to perform this function, a valve stem 50 which is slightly longer than normal would cause the cup leather 58 to strike the shoulder 64 before the valve 46 had closed and the coupling would be ineffective to perform its normal function.

It will be apparent that the assembled female coupling element is a self-contained unitary structure of convenient and serviceable shape, but that disconnecting the front and rear sleeves by unscrewing them will let the metal ring 54, the valve seat 52, the valve and its stem 50, the springs 24 and 60g, the cup leather 58 and washer 56g, all fall apart into as many separate pieces. Thus, any or all of the parts which may have been worn by usage or damaged by the insertion into the coupling member of tools not intended for such use, may readily be replaced, or repaired and all the "insides" stacked together again and reassembled by threading the sleeves together.

Having thus illustrated and described a preferred embodiment of my invention, what I claim and desire to secure by United States Letters Patent is:

1. A lubricant coupling member comprising a sleeve, means at one end of said sleeve for drawing a receiving fitting into said sleeve, a valve seat in said sleeve, a valve having a stem projecting outwardly through said seat, a valve spring back of said valve tending to seat said valve, a sealing gasket overlying the outer end of said stem, and a gasket spring pressing said gasket gently against the end of said stem, said valve spring being under greater tension than said gasket spring.

2. A lubricant coupling member comprising a sleeve, means at one end of said sleeve for drawing a receiving fitting into said sleeve, a valve seat in said sleeve, a valve having a stem projecting outwardly through said seat, a valve spring back of said valve tending to close said valve, a sealing gasket, and a gasket spring pressing said gasket gently against the end of said stem.

3. A lubricant coupling member comprising a sleeve, means at one end of said sleeve for drawing a receiving fitting into said sleeve, a second sleeve secured to said first named sleeve, a valve seat clamped between said sleeves, a valve for cooperating with said seat, said valve having a gasket for effecting a seal with a receiving fitting, a spring for closing said valve, and a second spring for holding said gasket against said valve, said springs tending to move said valve in opposite directions.

4. A lubricant coupling member comprising conduit means, a valve seat therein, a valve for coacting with said seat, means for closing said valve, means for connecting said conduit means with a lubricant receiving fitting, a stem for said valve projecting outwardly through said seat, a sealing gasket for contacting with the end of said stem, and resilient means for maintaining said sealing gasket firmly in contact with said stem, said means automatically adjusting itself to various lengths of valve stem.

5. A lubricant coupling member comprising a sleeve, means at one end of said sleeve for drawing a receiving fitting into said sleeve, a valve seat in said sleeve, a valve having a stem projecting outwardly through said seat, a spring for closing said valve, a sealing gasket overlying the outer end of said stem, said sealing gasket and stem having co-operating openings for establishing communication between the outer face of said gasket and the opening through said valve seat, and means beyond said gasket for continually pressing said gasket against the end of said stem.

In witness whereof, I hereunto subscribe my name this 9th day of May, 1927.

ERNEST W. DAVIS.